Aug. 10, 1943.     W. H. CHAMBERLAIN     2,326,437
COUNTER MOLDING MACHINE
Filed July 10, 1941     2 Sheets-Sheet 1
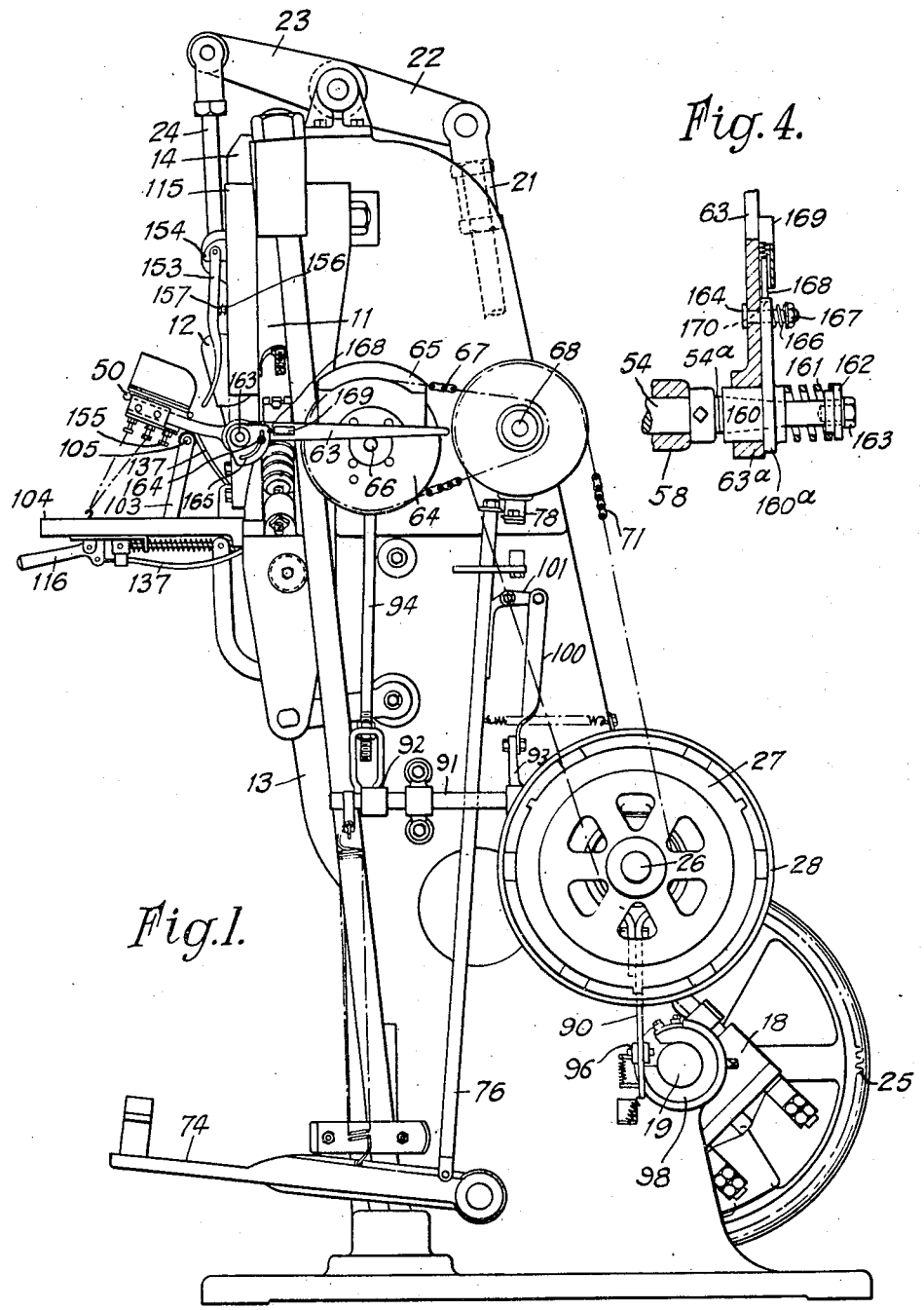
INVENTOR
WILLIAM HEDGER CHAMBERLAIN Aug. 10, 1943. W. H. CHAMBERLAIN 2,326,437
COUNTER MOLDING MACHINE
Filed July 10, 1941 2 Sheets-Sheet 2
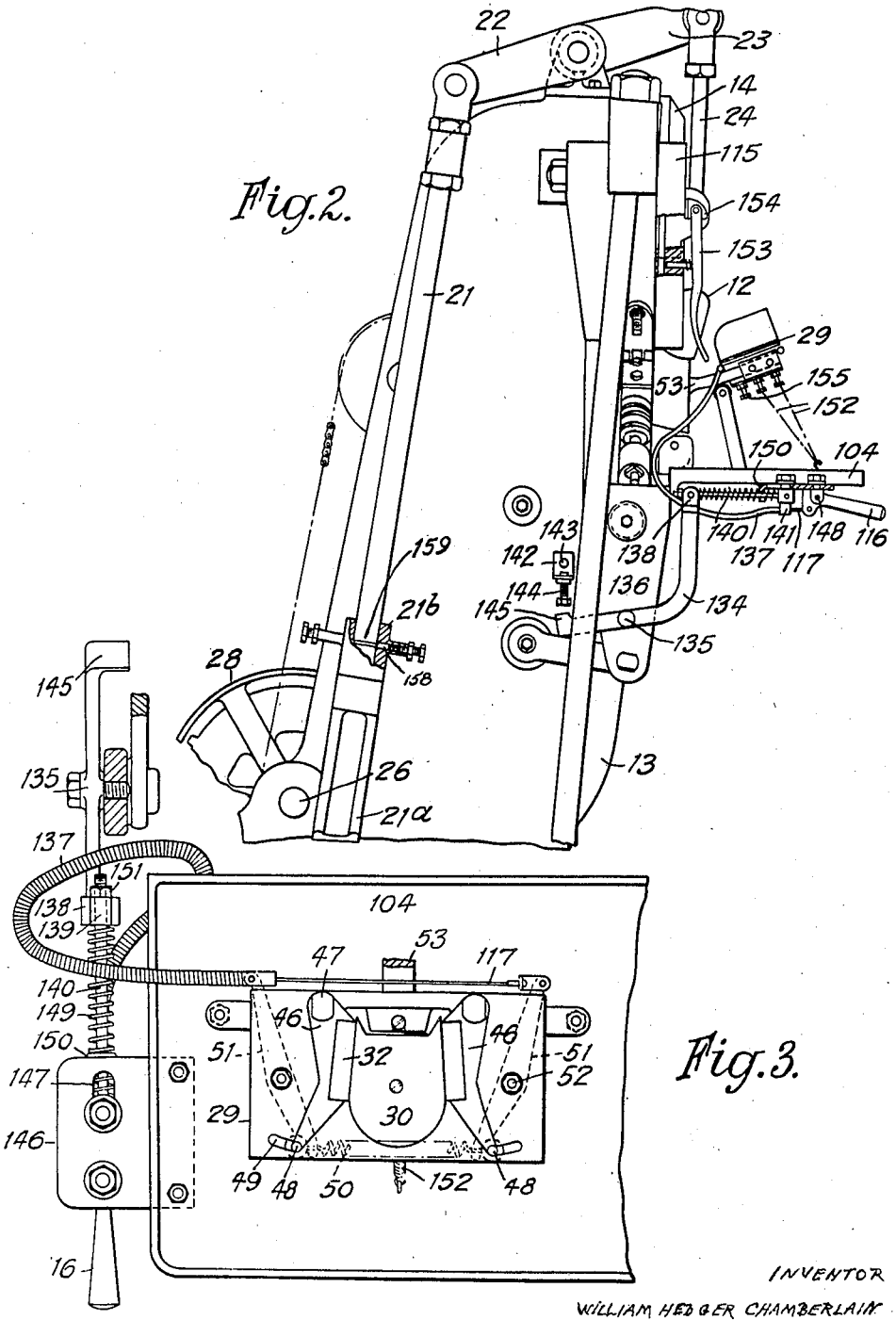
INVENTOR
WILLIAM HEDGER CHAMBERLAIN

UNITED STATES PATENT OFFICE 2,326,437

COUNTER MOLDING MACHINE

William Hedger Chamberlain, Higham Ferrers, England

Application July 10, 1941, Serial No. 401,830
In Great Britain March 7, 1941

17 Claims. (Cl. 12—66)

This invention relates to machines of the Stewart type for molding shoe heel counters, and more particularly to the counter molding machine described in my prior Patent No. 2,153,235, dated April 4, 1939.

The invention has for its main object to provide improved and automatic means for the release of the jaws gripping the counter blank upon the carrier which presents the blank to the mold, whereby the output capacity of the machine is considerably increased. Further objects of the invention are to provide improved safety devices for preventing damage to the parts of the machine in the event of obstruction due to maladjustment of the carrier or to other causes.

Other objects and advantages of the invention will hereinafter appear from the following description given with reference to the accompanying drawings, in which:

Fig. 1 is a side elevation of the improved molding machine as viewed from the right hand side.

Fig. 2 is a partial side elevation as viewed from the left hand side of the machine, certain details being represented in section.

Fig. 3 is a plan on a larger scale, showing the carrier and the jaw-releasing means.

Fig. 4 is a detail in sectional plan, also on a larger scale, showing the mounting of the carrier operating arm.

Referring to Figs. 1 and 2, the molding machine comprises as usual movable jaws 11 rocking inwardly on either side of a center piece 12, the counter blank being gripped in the gap between the parts of the mold, in conjunction with vertical pressure applied from the center piece 12 by a bottom plunger or moving beam 13, whereupon the curved edge projecting from the mold is flanged over by a door or wiper slide 14 which descends over the front face. The bottom plunger is operated by an eccentric block 18 from the middle of a crankshaft 19, one end of which operates a connecting rod 21 controlling the wiper slide 14 through rocking levers 22, 23 and a link 24; the crankshaft is driven by enclosed gearing 25 from a main shaft 26, the latter being driven through a clutch 27 by any suitable means, for example by belting upon the pulley 28.

As described in my prior patent aforesaid, the presentation of the counter blanks to the mold is effected by a carrier comprising for example a plate 29 having a shallow block 30 thereon to receive the blank which is applied by hand when the plate 29 is stationary in its lowered position; two gripping jaws 32 are mounted at the opposite sides of the block 30 to engage the edge of the blank fitted around the block. The jaws 32 are carried by levers 46 pivoted on pins 47 adjacent to one edge of the plate 29, and the other ends of the levers are fitted with studs 48 extending through curved slots 49 adjacent to the opposite edge of the plate; beneath the plate, these studs are connected together by a tension spring 50 and are also engaged by levers 51 pivoted at 52, whereby the jaws 32 can be drawn away from the block 30 to allow the insertion of a blank or its release from the jaws. The carrier plate 29 is adjustably mounted upon a crank arm 53 secured to a horizontal rocking shaft 54 extending to one side of the machine, the crank arm being approximately in line with the center of the mold; the shaft 54 is rotatably mounted in a bracket 58 secured to the plunger or beam 13, and its outer end is fitted with another crank arm 63 normally fixed in relation to the shaft and set approximately opposite to the first crank arm 53. The second crank arm 63 passes across a disc or wheel 64 fitted with a cam shoe 65 and mounted on a shaft 66 driven by a chain 67 from a countershaft 68, itself driven by a chain 71 from the main shaft 26 at the back of the machine; the chain gearing is so proportioned that one revolution of the cam shaft 66 corresponds to one cycle of operations of the molding machine, that is, to one revolution of the bottom shaft 19, and the countershaft 68 is fitted with a friction clutch for conveying the drive to the cam shaft in order to start the cycle of operations, this clutch being controlled by a pedal 74 through a rod 76 and a clutch striking fork 78.

The clutch 27 for driving the main shaft 26 is controlled by a forked lever 90 secured upon a shaft 91 fitted with two cranks 92, 93; the crank 92 is connected to a push rod 94 adapted to be depressed by the cam shaft 66, the main clutch 27 being thus engaged for operation of the shaft 26 and of the bottom shaft 19 geared thereto. The lower end of the lever 90 is fitted with a pawl 96 co-operating with a cam 98 on the end of the shaft 19, whereby the clutch is disengaged after one revolution of the shaft, that is, at the completion of the molding cycle. The other crank 93 serves to free the rod 76 from the striking fork 78 by means of a link 100 and bell crank lever 101, so as to interrupt the drive to the cam shaft 66 and prevent the machine from continuing in another cycle of operations, even though the pedal 74 be kept depressed by the operator.

With the machine at rest, the wiper slide 14 being raised for admission of a blank into the gap of the mold, the carrier plate 29 rests upon a saddle 103 bolted to a tray 104 projecting from the front of the machine; the jaws 32 can be opened to allow insertion of the blank by means of a flexible Bowden wire transmission mechanism, operated by a handle 116 mounted at the left hand side of the tray 104, as seen in Figs. 1 to 3. The tensioning of the inner wire 117 of the Bowden mechanism draws together the rear ends of the levers 51, of which the front ends separate the studs 48 so as to force apart the levers 46 and thus open the jaws; upon release of the handle 116, the spring 50 draws the levers 46 together, causing the jaws 32 to close upon the blank. The operator then depresses the control pedal 74, causing the cam shaft 66 to be set in motion; the cam shoe 65 forces down the crank arm 63, thereby raising the first crank arm 53 with the carrier plate 29 and bringing the blank into the gap of the mold, while the depression of the rod 94 by the cam shaft will engage the main clutch 27 for driving the shafts 26 and 19 to lift the plunger 13 and then to lower the wiper slide 14.

As best seen in Fig. 2, a rocking lever 134 is pivoted at 135 on the side of the moving link 136 which guides the plunger or beam 13 in its movement produced by the eccentric block 18; the front end of the lever 134 is cranked upwards and forked at 138 to engage a trunnion member 139 upon a spring-loaded rod 140 pivotally connected to a slidable block 141 against which the outer casing 137 of the Bowden mechanism abuts. The point at which the lever 134 performs its rocking movement is determined by an adjustable stop mounted upon the frame of the machine; as shown, an angle-iron bracket 142 bolted at 143 to the side of the frame, immediately above the rear end of the lever, carries a vertical screw 144 having its head placed downwards in the path of the lever, the rear end 145 of which is cranked over laterally to meet the screw head. The block 141 and the handle 116 are shown mounted upon an extension plate 146 at the side of the tray 104; the block is slidable along a slot 147 in line with the rod 140, while the handle 116 is pivoted upon a support 148 fixed in the plate. A spring 149 coiled around the rod 140 is engaged at an intermediate point in its length by a fork 150 projecting down from the edge of the plate 146; the part of the spring engaged between the fork 150 and the block 141 acts to return the latter to normal position, while the rest of the spring acts to hold the member 139 against an adjuster nut on the end of the rod 140.

The operation of the handle 116 will tension the inner wire 117 of the Bowden mechanism, as already described, for opening the jaws 32 manually to allow insertion of a blank at starting the machine, whereas the automatic rocking of the lever 134 due to the rise of the plunger or beam 13 will compress the outer casing 137 for opening the jaws mechanically to allow insertion of a blank in readiness for a subsequent cycle of operations. The mechanical release of the jaws by the rise of the plunger or beam 13 and link 136 takes place at the moment when the blank is gripped in the mold; the carrier is then free to fall away from the mold, its movement being assisted by one or more springs 152 connected to the tray 104. During this movement, the spring jaws remain open, so that the operator has time to insert a fresh blank in the carrier before the descent of the plunger or beam 13 and return of the block 141 can allow the spring 50 to close the jaws upon the blank; the next cycle of operations will begin as soon as the pedal 74 is depressed. In this way, there is obtained a considerable increase in the rate of operation of the molding machine, because the handle 116 controlling the inner wire of the Bowden mechanism need only be operated at starting the machine and not at the beginning of every molding operation or cycle, though it still remains available for opening the jaws 32 in the event of the operator failing to insert a fresh blank while the jaws are maintained open by the table movement.

The fall of the carrier under the action of the springs 152, when released by the opening of the jaws 32, is preferably facilitated or accelerated by means of a pair of spring-controlled lever arms 153 mounted upon brackets 154 near the top of the stationary wiper-guides 115; these arms hang downwards so as to be engaged by the carrier plate 29, for example by means of a pair of adjustable screws 155 at the outer corners of the plate. Intermediately of their length, the arms 153 are fitted with pins 156 extending horizontally through the wiper guides 115 so that the inner extremities of these pins come just below the bottom edge of the wiper 14 at the limit of its upward movement; the pins 156 are pressed inwards as the carrier engages the arms 153 and therefore serve to prevent the wiper slide from travelling far enough to damage the mold or other parts if the carrier still remains in its raised position. Springs 157 are coiled around the pins 156, between the arms 153 and the faces of the wiper guides 115, to provide the necessary control for the arms 153 and also to return the pins 156 as the carrier moves away from the mold.

In the event of the descending wiper 14 striking the inwardly pressed pins 156, the side rod 21 operating the wiper by means of the overhead rocking levers 22, 23 will be subjected to a strain which may be excessive; to avoid this, the rod 21 is preferably fitted with a safety device at the point where the lower end of its round portion is connected to the cranked portion engaged by the crank pin of the bottom shaft 19. In a convenient construction, as illustrated in Fig. 2, the upper end of the cranked portion 21a is fitted with a steel extension or sleeve 21b, brazed thereto, within which the lower end of the round portion 21 is slidable; three spring-loaded poppets or cone-ended pins 158 are mounted radially in the sleeve 21b so as to engage in a V-section groove 159 cut around the rod 21 inside the sleeve, the pins 158 yielding to excessive pressure and allowing the rod 21 to drop through the sleeve 21b without causing damage.

A further safety device may be provided in conjunction with the presenter by mounting the driving crank arm 63 upon the outer end of the rocking shaft 54 by means of a spring-loaded friction-cone device, which permits the carrier to yield in the event of obstruction. As shown in Figs. 1 and 4, the crank arm 63 engaged by the shoe 65 upon the cam shaft 66 has its boss 63a rotatably mounted upon an internally coned sleeve 160 seated upon a tapered portion 54a of the rocking shaft 54; this sleeve has a quadrant 160a fixed to or formed integral with it towards one end. A compression spring 161 is mounted around the free end of the shaft, being retained by a washer plate 162 secured by a screw 163 fittted in the end of the shaft; the spring 161 forces the coned sleeve 160 into firm contact with its tapered seating upon the shaft, the strength of the spring being sufficient to prevent slip under all normal conditions. The crank arm 63 is held in contact with the face of the quadrant 160a by a bolt 164 seated in the arm and engaging in an arcuate slot 165 in the quadrant, the free end of the bolt being fitted with a coiled spring 166 adjustable by means of a nut 167 to vary the contact pressure; relative movement of the crank arm 63 and quadrant 160 is normally prevented by the frictional driving contact between them under the pressure of the spring 166 and is also controlled by a spring-loaded pawl 168 mounted in a housing 169 upon the crank arm, the point of this pawl snapping into a notch 170 upon the edge of the quadrant 160a. If, however, the presenter is obstructed in its rising movement, the crank arm 63 slips in relation to the quadrant, forcing the pawl 168 out of the notch 170, and moves idly upon the sleeve 160, while the shaft 54 and crank arm 53 come to rest; re-setting of the crank arm 63 takes place automatically upon the return movement, by an equivalent slip in the contrary sense when the carrier plate 29 strikes the saddle 103 upon the tray at the front of the machine, the arm 63 being lifted by hand or by any convenient device to its normal position (at which the pawl 168 snaps back into the notch 170) for engagement by the shoe 65. The object of the friction-cone mounting of the sleeve 160 is to permit accurate location of the crank arm 63 in relation to the rocking shaft 54 and to the other crank arm 53 after the pawl 168 has been engaged in the notch 170 upon the quadrant 160a; the screw 163 will then be tightened to compress the spring 161 and to force the sleeve 160 upon its tapered seating, thus fixing the relative angular position of the crank arm 53 and quadrant 160a.

It will be seen that the present invention greatly simplifies and facilitates the operation of the molding machine, since the operator is relieved of the care of opening the spring jaws upon the carrier at every cycle in order to insert the fresh blank; the jaws can be conveniently operated by means of the handle 116 for the insertion of a blank at starting the machine, but the same Bowden mechanism is operated automatically and mechanically by the movement of the table in order to open the jaws immediately the blank is presented or as soon as it has been gripped in the mold; the carrier can then move away from the mold, with its jaws maintained open, thus allowing the operator to insert a fresh blank before the return of the table allows the jaws to reclose and grip the new blank. Moreover the improved safety devices reduce to a minimum the risk of damage to the blanks or counters or to the parts of the machine.

What I claim is:

1. In a counter molding machine of the character described, a carrier having an upward rocking movement for presenting a counter blank to the mold, said carrier including jaws adapted to engage a counter blank by the edge normally projecting from the mold, manual means for releasing said jaws to admit the edge of a blank for engagement, and mechanical means for releasing said jaws from their engagement with said edge after the remainder of said blank has entered into the mold, said mechanical means including a member movably mounted on and actuated by the rise of the bottom plunger of the machine for opening said jaws immediately upon the gripping of the blank in the mold.

2. In a counter molding machine of the character described, a carrier having an upward rocking movement for presenting a counter blank to the mold, said carrier including jaws adapted to engage a counter blank by the edge normally projecting from the mold, manual means for releasing said jaws to admit the edge of a blank for engagement, and mechanical means for releasing said jaws from their engagement with said edge after the remainder of said blank has entered into the mold, said manual and said mechanical means operating through a common transmission system for releasing said jaws.

3. In a counter molding machine of the character described, a carrier having an upward rocking movement for presenting a counter blank to the mold, said carrier including jaws adapted to engage a counter blank by the edge normally projecting from the mold, manual means for releasing said jaws to admit the edge of a blank for engagement, and mechanical means for releasing said jaws from their engagement with said edge after the remainder of said blank has entered into the mold, said manual and said mechanical means operating through a common Bowden mechanism for releasing said jaws, said manual means operating by applying tension to the inner wire of said mechanism, and said mechanical means operating by applying compression to the outer casing of said mechanism.

4. In a counter molding machine of the character described, a carrier having an upward rocking movement for presenting a counter blank to the mold, said carrier including jaws adapted to engage a counter blank by the edge normally projecting from the mold, and mechanical means for releasing said jaws from their engagement with said edge after the remainder of said blank has entered into the mold, said mechanical means including a lever rocked by the rise of the bottom plunger of the machine, and a flexible transmission system connected between said lever and said jaws.

5. In a counter molding machine of the character described, a carrier for presenting a counter blank to the mold, said carrier including spring-operated jaws for engaging the counter blank by the edge normally projecting from the mold, means for moving said carrier towards and away from the mold, and mechanical means for releasing said jaws including a member movably mounted on the bottom plunger and actuated by the movement of it during the rise of the bottom plunger of the machine, said jaws remaining released during the movement of said carrier away from the mold and until the descent of the bottom plunger.

6. In a counter molding machine of the character described, a carrier for presenting a counter blank to the mold, comprising a member adapted to rock towards and away from the mold, spring means for gripping a counter blank upon said member in a position for entering the mold as said member rocks towards the mold, manual means for releasing said gripping means at the insertion of a counter blank therein, and means including a member movably mounted on the bottom plunger operated by the rise of the bottom plunger of the machine for releasing said gripping means after entry of the counter blank into the mold and immediately upon the gripping of the blank in the mold, said gripping means then remaining released as said member rocks away from the mold and until descent of the bottom plunger.

7. In a counter molding machine of the character described, a carrier for presenting a counter blank to the mold, comprising a member adapted to rock towards and away from the mold, spring means for gripping a counter blank upon said member in a position for entering the mold as said member rocks towards the mold, manual means for releasing said gripping means at the insertion of a counter blank therein, and means operated by the bottom plunger of the machine at a variable point in its rise for releasing said gripping means after entry of the counter blank into the mold, said gripping means then remaining released as said member rocks away from the mold and until a corresponding variable point in the descent of the bottom plunger.

8. In a counter molding machine of the character described, a carrier for presenting a counter blank to the mold, means for moving said carrier towards and away from the mold, means for disengaging the counter blank from said carrier in advance of the descent of the wiper of the machine, and means for assisting the movement of said carrier away from the mold after entry of the counter blank into the mold, said assisting means including a spring-controlled arm mounted upon a wiper guide of the machine and engaged by said carrier as it moves towards the mold.

9. In a counter molding machine of the character described, a carrier for presenting a counter blank to the mold, means for moving said carrier towards and away from the mold, means for disengaging the blank from said carrier in advance of the descent of the wiper of the machine, and safety means for preventing damage by the descent of the wiper before movement of said carrier away from the mold, said safety means including a spring-controlled arm mounted upon a wiper guide of the machine and engaged by said carrier as it moves towards the mold, and a pin slidable through the wiper guide into the path of the wiper, said pin being controlled by said arm.

10. In a counter molding machine of the character described, a carrier for presenting a counter blank to the mold, means for moving said carrier towards and away from the mold, means for disengaging the blank from said carrier in advance of the descent of the wiper of the machine, and safety means for preventing damage by the descent of the wiper before movement of said carrier away from the mold, said safety means including a spring-controlled arm mounted upon a wiper guide of the machine and engaged by said carrier as it moves towards the mold, a pin slidable through the wiper guide into the path of the wiper, said pin being controlled by said arm, and a yielding connection in the drive to the wiper.

11. In a counter molding machine of the character described, a carrier for presenting a counter blank to the mold, a rocking shaft for moving said carrier towards and away from the mold, an operating crank upon said shaft, a frictional drive connection from said crank to said shaft, said frictional drive connection being adapted to yield in the event of obstruction to the movement of said carrier towards the mold, and means for limiting the slip in said frictional drive connection.

12. In a counter molding machine of the character described, a carrier for presenting a counter blank to the mold, a rocking shaft for moving said carrier towards and away from the mold, an operating crank upon said shaft, a frictional drive connection from said crank to said shaft, said frictional drive connection being adapted to yield in the event of obstruction to the movement of said carrier towards the mold, means for limiting the slip in said frictional drive connection from said crank, and an auxiliary drive connection to said shaft, sad auxiliary drive connection serving to locate the initial position of said shaft.

13. In a counter molding machine of the character described, a carrier having an upward rocking movement for presenting a counter blank to the mold, said carrier including jaws adapted to engage a counter blank by the edge normally projecting from the mold, and mechanical means for operating said jaws by the movements of the bottom plunger of the machine, said mechanical means being actuated by the rise of the bottom plunger to release said jaws from their engagement with said edge after the remainder of the blank has entered into the mold but being actuated in the reverse sense for the engagement of another blank during the descent of the bottom plunger.

14. In a counter molding machine of the character described, a carrier having an upward rocking movement for presenting a counter blank to the mold, said carrier including jaws adapted to engage a counter blank by the edge normally projecting from the mold, manual means for releasing said jaws to admit the edge of a blank for engagement by said jaws, and mechanical means for releasing said jaws from their engagement with said edge after the remainder of the blank has entered into the mold, said mechanical means being actuated to release said jaws by the rise of the bottom plunger of the machine but being actuated in the reverse sense for the engagement of another blank during the descent of the bottom plunger, and said manual means enabling an operator to release said jaws even after such reverse actuation of said mechanical means for engagement of another blank.

15. In a counter molding machine of the character described, a carrier for presenting a counter blank to the mold, said carrier including spring-operated jaws for engaging the counter blank by the edge normally projecting from the mold, means for moving said carrier towards and away from the mold, and mechanical means for releasing said jaws including a member movably mounted on the bottom plunger of the machine and actuated by the rise of the bottom plunger, said jaws remaining released during the movement of said carrier away from the mold and until the descent of the bottom plunger, and said mechanical means being actuated in reverse sense during the descent of the bottom plunger for engagement of another counter blank by said jaws.

16. In a counter molding machine of the character described, a carrier for presenting a counter blank to the mold, comprising a member adapted to rock towards and away from the mold, spring means for gripping a counter blank upon said member in a position for entering the mold as said member rocks towards the mold, manual means for releasing said gripping means at the insertion of a counter blank therein, and means including a member mounted on the bottom plunger of the machine and actuated by the rising movement of the bottom plunger to release said gripping means after entry of the counter blank into the mold and immediately upon the gripping of the blank in the mold, said gripping means then remaining released as said first-mentioned member rocks away from the mold and until descent of the bottom plunger, but being re-engaged automatically during descent of the bottom plunger for gripping another counter blank, subject to control by said manual releasing means.

17. In a counter molding machine of the character described, a carrier for presenting a counter blank to the mold, comprising a member adapted to rock towards and away from the mold, spring means for gripping a counter blank upon said member in a position for entering the mold as said member rocks towards the mold, and means actuated by the bottom plunger of the machine at a variable point in its rise for releasing said gripping means after entry of the counter blank into the mold, said gripping means then remaining released as said member rocks away from the mold and until a corresponding variable point in the descent of the bottom plunger, but being re-engaged automatically during further descent of the bottom plunger for gripping another counter blank.

WILLIAM HEDGER CHAMBERLAIN.